June 6, 1967 R. L. LAMBERT ET AL 3,323,915

DOUBLE CAST POROUS ELECTRODE

Filed Dec. 4, 1964 2 Sheets-Sheet 1

INVENTORS
ROBERT L. LAMBERT &
WILLIAM R. McKEIRNAN
BY
Robert E. Strausser
ATTORNEY United States Patent Office 3,323,915
Patented June 6, 1967

3,323,915
DOUBLE CAST POROUS ELECTRODE
Robert L. Lambert, Emporium, and William R. McKeirnan, Crosby, Pa., assignors to Sylvania Electric Products Inc., a corporation of Delaware
Filed Dec. 4, 1964, Ser. No. 415,995
10 Claims. (Cl. 75—201)

This invention relates to plate supports for storage batteries and more particularly to plate supports for carrying the active materials of storage battery electrodes and a process for fabricating such supports.

In storage batteries, it is a common practice to provide a porous plate support and to load the pores thereof with chemically active material to provide an electrode. Such a technique is entirely satisfactory so long as the capacity demands on the battery remain relatively small. However, as the demands on the battery are increased, the electrode capacity must be increased which becomes somewhat of a problem because of the tendency for the porous plate support to distort or collapse. Thus, it has become a common practice to include a metal network in the plate support to provide not only rigidity and strength but electrical conductivity as well.

In attempting to fabricate porous plate supports which include a metal network therein, several problem areas become immediately apparent. For example, fabricating a plate support having not only the desired but a uniform porosity throughout becomes more difficult when a metal network is included therein. Also, providing uniformly thick plate supports with an undistorted and uniformly located metal network therein is further complicated when the fabrication process, of necessity, is repetitive.

Of the known methods for fabricating plate supports containing a metal network, several appear to be in common usage. In one technique, a quantity of dry metal particles is deposited in a mold, a metal network placed thereon, and a second quantity of dry metal particles is poured into the mold covering the network. Then, heat sufficient to sinter the metal particles to each other and to the network is applied.

Other methods include the spraying or painting of a metal network with a low viscosity suspension containing metal particles and the brushing or stroking of a high viscosity suspension onto a metal network. Thereafter, the network and suspensions are heated to sinter the metal particles to each other and to the network.

Although the above techniques are extensively used, it has been found that the plate supports obtainable by such methods leave much to be desired. For example, it has been found that the plate supports obtainable from a loose metal particle process have a tendency to vary in density and thickness. Further, the difficulty of maintaining the network at a uniform location within the porous structure is a continual problem, and all of these undesirable features are greatly magnified as the porosity of the structure is increased.

Also, it is well known that plate supports for battery electrodes should have a relatively high porosity. Thus, a low viscosity suspension technique inherently provides a relatively low porosity structure which is inconsistent with the requirements for battery plate supports. Moreover, it is most difficult, if not impossible, to maintain a homogeneous dispersion of metal particles in such a suspension because of the tendency for the relatively heavy metal particles to "settle out."

On the other hand, a high viscosity suspension is consistent with the provision of a relatively high porosity structure. However, it has been found that applying such a suspension to a screen by a brushing or stroking technique results in variations in thickness and density of the final product. Not only does the plate support vary in thickness and density but the technique is inconsistent with a repetitive process wherein uniformity of the final product is of prime importance.

Additionally, all of the above-mentioned methods are, as far as is known "batch" techniques wherein a single process is repeated for each plate support or at least for each small quantity of plate supports. Such a technique has been found a severe handicap to increased productivity, cost reduction, reduced material scrap, and numerous other factors when compared with a continuous and uninteruped process.

Therefore, it is an object of this invention to provide a continuous and enhanced process for fabricating plate supports suitable for use in the manufacture of electrodes for storage batteries.

Another object of the invention is to provide a continuous process for fabricating plate supports having an undistorted metal network located within a uniformly thick and porous structure suitable for use in the manufacture of storage battery electrodes.

A further object of the invention is to provide a continuous process for fabricating plate supports of uniform porosity, thickness, and mechanical strength.

A still further object of the invention is to provide a plate support of uniform porosity and thickness which includes an undistorted metal network at a uniform location within the structure.

These and other objects are achieved in one aspect of the invention by continuously forming a first film containing metal particles, continuously affixing a metal network to the first film, continuously forming a second film containing metal particles affixed to the first film and metal network, and heating the first and second films to sinter the metal particles to each other and to the metal network.

For a better understanding of the present invention, together with other and further objects, advantages, and capabilities thereof, reference is made to the following disclosure and appended claims in connection with the accompanying drawings in which:

Figure 1:
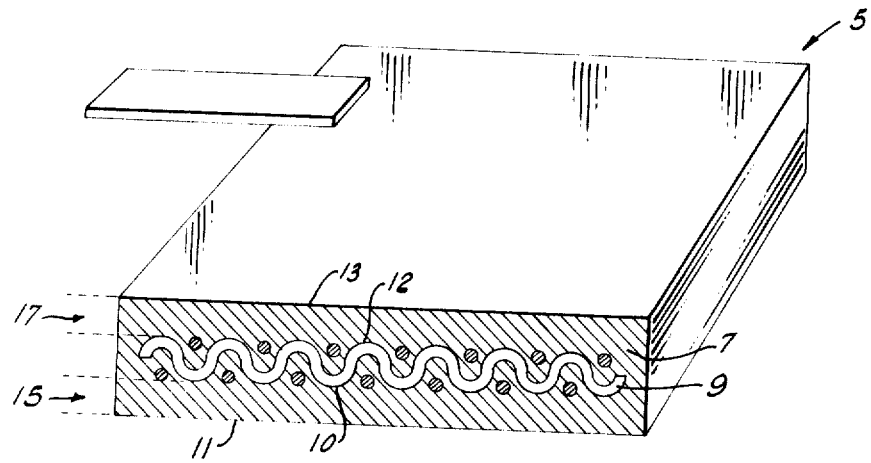
FIG. 1 is a perspective view, in section, of a plate support suitable for use in the fabrication of storage battery electrodes.

Referring to FIG. 1 of the drawings, a plate support 5 includes sintered metal particles 7 surrounding and attached to a metal network 9 with the metal particles 7 extending through apertures in the network 9. The plate support 5 preferably has a porosity in the range of about 50–90% and a thickness dimension, measured normal to the network, in the range of about 0.010 to 0.140 inch. Also, extending from opposing surfaces 10 and 12 of the network 9 to the outer surfaces 11 and 13 of the support 5 are metal particle layers 15 and 17 of substantially equal thickness. Each of these layers 15 and 17 has a thickness in the range of about 0.005 to 0.060 inch and is fabricated from a pliable self-supporting film of metal particles homogeneously dispersed in an organic binder and plasticizer.

As to materials, the metal particles 7 are of a sinterable material suitable for use in battery electrodes, and nickel and alloys thereof are preferred materials. However, silver, copper, iron, and aluminum, as well as alloys and mixtures thereof, are also applicable and appropriate. Further, the metal network 9 is also of a similar material and has or is made to have a flexibility sufficient to permit bending of the support 5 without fear of rupture of the sintered metal particles 7 by the network 9.

Figure 2:
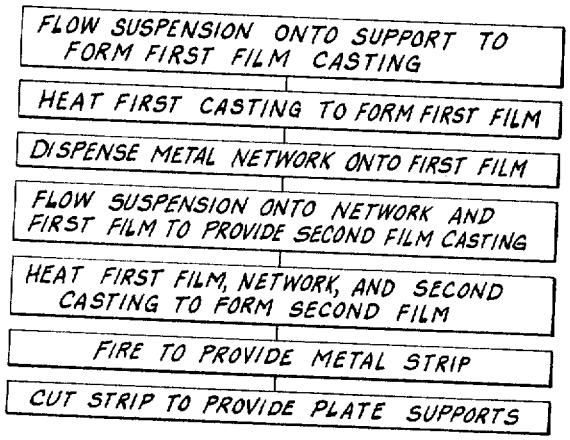
FIG. 2 is a flow chart illustrating a process for fabricating plate supports.

As to the fabrication of plate supports 5, reference is made to U.S. Patent No. 2,965,927 of Crosby and Stoll; co-pending application Ser. No. 306,586, filed Sept. 4, 1963 for Kerstetter and Montgomery entitled "Powdered Metal Films;" and the flow chart of FIG. 2.

Generally, a viscous suspension of sinterable metal particles homogeneously dispersed in an organic binder and plasticizer dissolved in a volatile organic solvent is flowed onto a continuously moving support to provide a first film casting. The casting is dried to provide a first pliable self-supporting film and a metal network is dispensed onto and substantially covers the surface of the first film. A similar suspension is flowed onto the metal network to provide a second film casting which is dried to provide a second pliable self-supporting film. Then the composite structure, which includes the first and second films with a metal network therebetween, is fired to volatilize the organic materials and sinter the metal particles to each other and to the metal network.

More specifically, the suspension includes sinterable metal particles homogeneously dispersed in an organic binder and plasticizer dissolved in a volatile solvent. The details of suspensions suitable for the process are fully disclosed and detailed in the above-mentioned application of Kerstetter and Montgomery and in the co-pending application of Lambert et al., Ser. No. 105,889, filed Apr. 27, 1961, now Patent No. 3,171,817, entitled "Powdered Metal Film Composition."

Briefly, the binders and plasticizers are of the organic type which volatilize below the sintering temperature of the metal particles and do not leave a residue which would be detrimental to the sintering of the metal particles. Further, the solvents are preferably a mixture having different evaporative rates and boiling temperatures in order to properly dissolve the organic materials, render it easier to control the viscosity of the suspension, and attain a predictable evaporation rate substantially equal to the rate of diffusion thereof through the film.

The metal particles must be solid in form and sinterable. Also, the suspension has a metal particle content in the range of about 25–75% by weight of the suspension, and the suspension has a viscosity in the range of about 10,000 to 80,000 cps. as measured by a Brookfield viscosimeter. When the metal particle content is less than about 25%, it has been found difficult, if not impossible, to obtain a contiguous relationship between the particles upon removal of the organic materials. A metal particle content greater than about 75% restricts the quantity of binder materials such that the provision of a pliable selfsupporting film is most difficult. Further, a viscosity less than about 10,000 cps. permits the relatively heavy metal particles to settle out of the suspension while a viscosity greater than about 80,000 cps. is detrimental to the uniformity of thickness and porosity, surface smoothness, and freedom of entrapped gases in a cast film.

Additionally, the suspension should be in the form of a viscous mass in order to maintain a homogenous dispersion of the metal particles when cast in the form of a film. Moreover, it has been found that a suspension in the form of a viscous mass is castable into a film having a smooth surface free from blemishes and a uniformity of thickness and porosity.

Further, it has been found that pliable self-supporting films having a thickness in the range of about 0.005 to 0.100 inch and a metal particle content in the range of about 75–97% by weight of the film may be cast when the above-mentioned suspension is utilized. Also, it has been found that such films, after the removal of the organic materials therefrom, provide pliable self-supporting metal strips having a porosity in the range of about 50–90% and a thickness in the range of about 0.005 to 0.060 inch.

As a specific example of a suitable suspension, the following formulation has provided pliable self-supporting films having a density of about 2.0 gms./cm.$^3$ and a thickness in the range of about 0.001 to 0.010 inch:

| | | |
|---|---|---|
| Toluene | ml | 360 |
| Ethyl alcohol | ml | 80 |
| Diethylene glycol monobutyl ether | ml | 16 |
| Ethyl cellulose | gms | 24 |
| Carbonyl nickel (3µ–4µ) | gms | 528 | in which the ethyl cellulose has an ethoxyl content of between 47.5 and 49.0% by weight and a viscosity of approximately 200 centipoises in a 5% solution of 80:20 toluene to ethanol.

Figure 3:
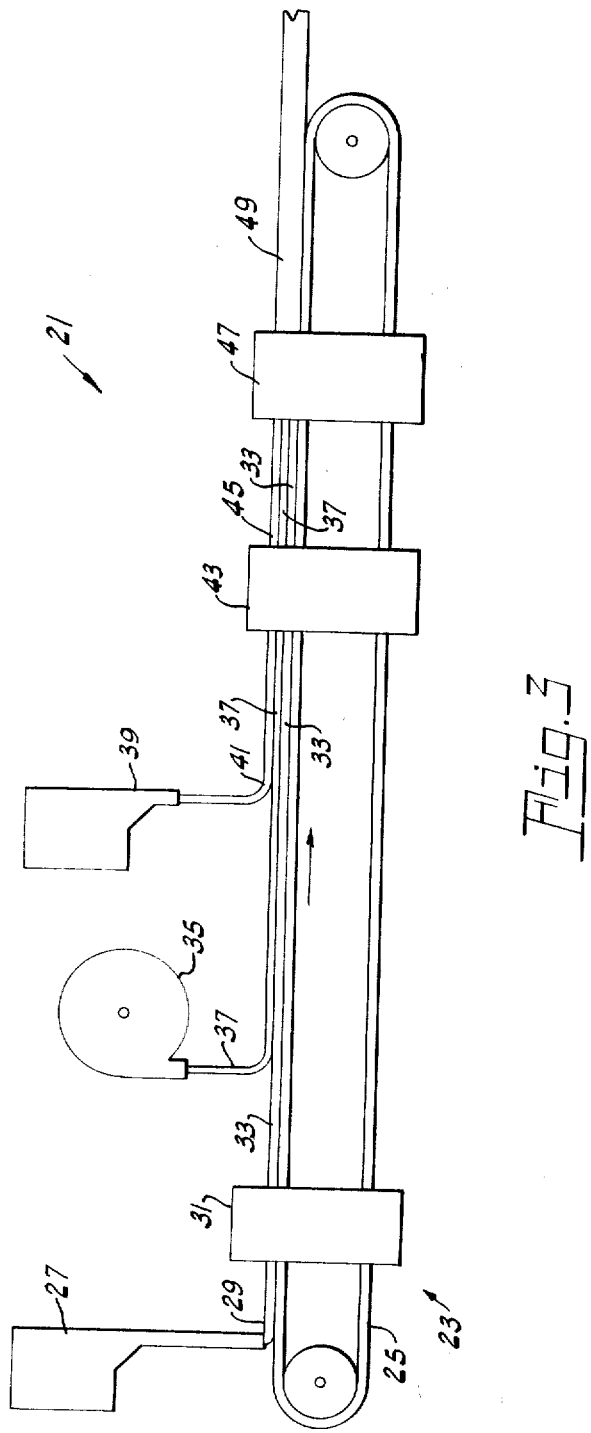
FIG. 3 is a diagrmmatic illustration of an apparatus suitable for continuously fabricating plate supports.

In order to more clearly illustrate the process, reference is made to the previously mentioned patent to Crosby and Stoll in conjunction with the representative apparatus illustrated in FIG. 3. In FIG. 3, a plate support forming apparatus 21 includes a conveyor 23 having an activating means (not shown) and an endless support means 25 such as a smooth stainless steel metal belt. A first dispensing means 27 holds a quantity of the previously detailed suspension, and this suspension is continuously deposited onto the support means 25 at a rate and in an amount sufficient to provide a first film casting 29 having a desired thickness.

This first film casting 29 is conducted through a first drying means 31 by the continuously moving support means 25 wherein the solvents in the casting 29 are evaporated therefrom at a rate substantially equal to the rate of solvent diffusion therethrough. In this manner it has been found that there is provided a first pliable self-supporting film 33 of substantially uniform thickness and free from blisters, fissures, and surface discontinuities. The drying means 31 may be any one of a number of well-known controllable heating means. For example, heating lamps or heating strips within an enclosure are suitable and appropriate.

The first film 33 includes sinterable metal particles homogeneously dispersed in a volatile organic binder and plasticizer and has a substantially uniform thickness in the range of about 0.005 to 0.100 inch. It has been found that films having a thickness less than about 0.005 inch are most difficult, if not impossible, to handle without special apparatus, and films greater than about 0.100 inch in thickness are difficult to fabricate without blemishes and uneven surfaces because of the difficulty in controlling the evaporation and diffusion rates of the solvents.

A second dispensing means 35 contains a quantity of a metal network 37 which may be any one of a number of types so long as it has or is treated to have pliability. For example, screens, meshes, and perforated metal strips are suitable materials. The metal network 37 is deposited by the dispensing means 35 onto the first film 33, and this network 37 adheres to and substantially covers the surface of the first film 33.

Upon leaving the second dispensing means 35, the first film 33 and adherent metal network 37 pass a third dispensing means 39 containing a quantity of the previously described suspension. Hereat, a second film casting 41 is deposited onto the metal network 37 adhered to the first film 33. This deposition of suspension from the third dispensing means 39 is in an amount and at a rate sufficient to not only provide a second film casting 41 but also sufficient to fill the apertures of the metal network 37. Although, the second film casting 41 has a thickness, as measured from the surface of the metal network 37 to the outer surface thereof, substantially equal to the thickness of the first film casting 29, the suspension deposition from the third dispensing means 39 is greater than the amount of suspension deposited from the first dispensing means 27.

The first film 33, the attached metal network 37, and the second film casting 41 progress through a second drying means 43 which is of the same general type as the first drying means 31, and the solvents are evaporated from the second film casting 41 at a rate substantially equal to the rate of solvent diffusion therethrough. Upon leaving the second drying means 43, there is provided a first pliable self-supporting film 33 of sinterable metal particles homogeneously dispersed in a volatile organic binder and plasticizer, a metal network 37 adhered thereto, and a second pliable self-supporting film 45 of sinterable metal particles homogeneously dispersed in a volatile organic binder and plasticizer adhered to the first film 33 and the metal network 37. Also, the second film 45 has a thickness, as measured from the surface of the metal network 37 to the outer surface thereof, substantially equal to the thickness of the first film 33, and this thickness is in the range of about 0.005 to 0.100 inch.

The continuously moving first film 33, adhered metal network 37, and affixed second film 45 are then passed through a firing means 47. Therein, the oragnic materials are volatilized and the metal particles sintered to each other and to the metal network 37 to provide a pliable self-supporting metal strip 49 including a metal network sintered to and intermediate substantially equal layers of sintered metal particles. The metal strip 49 has a porosity in the range of about 50 to 90% and a thickness in the range of about 0.010 to 0.140 inch, and each of the sintered metal particle layers has a thickness, as measured from the surface of the network 37 to the outer surface of the strip 49, of about 0.005 to 0.060 inch.

The above-mentioned firing means 47 includes a reducing atmosphere, such as dissociated ammonia for instance, to prevent the formation of undesired oxides on the metal particles which would be deleterious to the sintering process. Also, the temperature of the firing means 47 should be controllable and capable of operation in the range of about 1200 to 1700° F. As is well known, the porosity as well as the strength of the strip 49 may be altered by varying the temperature during the firing operation.

Thus, a pliable self-supporting metal strip 49 includes a metal network disposed in the center of substantially equal layers of sintered porous metal particles. The strip 49 is continuously produced and may be cut into segments to provide the plate supports 5 of FIG. 1 and then impregnated with active electrode materials to provide electrodes for batteries. Obviously, the strip 49 may also be impregnated with active electrode materials and then cut into segments to provide the plate supports 5 of FIG. 1.

As a specific illustration, a first suspension was prepared in accordance with the previously recited formulation, and a first casting having a thickness of about 0.020 inch was deposited on the continuously moving support. After drying and evaporation of the solvents, there was provided a first pliable self-supporting film having a thickness of about 0.015 inch. Then a layer of pliable expanded metal mesh having a thickness of about 0.012 inch was dispensed onto the first film.

A second casting of a suspension similar to the first suspension was dispensed onto the first film and the expanded mesh. This second casting was in an amount sufficient to fill the voids in the mesh and provide a second casting thickness, from the mesh to the outer surface thereof, of about 0.020 inch. The first film, the network, and the second casting was passed through a second drying means wherein the solvents were evaporated from the second casting to provide a second film having a thickness of about 0.015 inch. Thus, there was provided a 0.012 inch metal mesh located intermediate 0.015 inch layers of sinterable metal particles suspended in a volatile organic binder and plasticizer.

Thereafter, the first film, metal network, and second film were passed through a reducing atmosphere at a temperature of about 1500° F. wherein the organic materials were volatilized and the metal particles sintered to each other and to the network to provide a pliable self-supporting composite structure suitable for use as a plate support in a battery and having a thickness of about 0.038 inch and a porosity of about 80%.

Thus, there has been provided a structure as well as a unique process for fabricating the structure having numerous advantages over the known processes and structures suitable for fabricating plate supports for storage battery electrodes. For instance, the structure has a controllable and uniform porosity and strength as well as a consistent thickness and surface smoothness which is believed to be unobtainable in any of the known support structures suitable for use in batteries. Further, the process permits the fabrication of plate supports wherein the metal network is not only undistorted but also disposed within the porous metal layers at a desired, uniform, and predeterminable location. Also, the continuous process is not only economical in time, personnel, apparatus, and materials as compared with a "batch" process but also inherently includes a uniformity, consistency, and repeatability of the final product which is unobtainable in any of the known processes for fabricating plate supports for storage batteries.

While there has been shown and described what is at present considered to be the preferred embodiment of the invention, it will be obvious to those skilled in the art that various changes and modifications may be made therein without departing from the invention as defined by the appended claims.

What is claimed is:

1. A continuous process for fabricating plate supports suitable for carrying active materials to provide electrodes for storage batteries comprising the steps of:

flowing a first suspension of sinterable metal particles dispersed in a volatile organic binder and plasticizer dissolved in a volatile organic solvent and in the form of a viscous mass onto a continuously moving support to provide a first film casting;

evaporating said solvent from said film casting at a rate substantially equal to the rate of solvent diffusion therethrough to provide a pliable self-supporting film by heating said film casting during continuous movement thereof;

depositing a pliable metal network onto and covering the surface of said continuously moving first pliable self-supporting film;

flowing a second suspension of sinterable metal particles disposed in a volatile organic binder and plasticizer dissolved in a volatile organic solvent and in the form of a viscous mass onto said continuously moving metal network and first pliable self-supporting film, said suspension providing a second film casting filling the voids of said metal network and adhered to said first film and said metal network;

evaporating said solvent from said second film casting at a rate substantially equal to the rate of solvent diffusion therethrough to provide a second pliable self-supporting film by heating said film casting, metal network, and first pliable self-supporting film during continuous movement thereof;

volatilizing the organic materials from said first and second pliable self-supporting films and sintering said metal particles to each other and to said metal network to provide a pliable self-supporting metal strip including said metal network disposed intermediate porous layers of sintered metal particles; and cutting said metal strip into plate supports having a desired configuration.

2. The continuous process for fabricating plate supports of claim 1 wherein each of said porous layers of sintered metal particles has a substantially equal thickness dimension and is affixed to an opposite surface of said metal network, said layers extending through the voids of said metal network and into contact and attachment with each other.

3. The continuous process of claim 1 wherein said first and second suspensions each have a viscosity in the range of about 10,000 to 80,000 cps. as measured with a Brookfield viscosimeter.

4. The continuous process of claim 1 wherein first and second pliable self-supporting films each include approximately 25 to 75% by weight of sinterable metal particles.

5. The continuous process of claim 1 wherein said first and second pliable self-supporting films each include approximately 25 to 75% by weight of sinterable metal particles and have a thickness dimension in the range of about 0.005 to 0.100 inch.

6. The continuous process of claim 1 wherein said metal strip has a thickness dimension in the range of about 0.010 to 0.140 inch and a porosity in the range of about 50 to 90%.

7. The continuous process of claim 1 wherein said sinterable metal particles are selected from the metal group consisting of nickel, silver, iron, copper, and aluminum as well as alloys and mixtures thereof.

8. The continuous process of claim 1 wherein the step of volatilizing the organic materials from said first and second pliable self-supporting films and sintering said metal particles to each other and to said metal network is carried out in a reducing atmosphere at a temperature in the range of about 1200° to 1700° F.

9. The continuous process of claim 1 wherein said metal particles are carbonyl nickel particles and said reducing atmosphere is dissociated ammonia at a temperature of about 1500° F.

10. The continuous process of claim 1 wherein said first and second suspensions each have the following formulation:

| | | |
|---|---|---|
| Toluene | ml | 360 |
| Ethyl alcohol | ml | 80 |
| Diethylene glycol monobutyl ether | ml | 16 |
| Ethyl cellulose | gms | 24 |
| 3µ–4µ carbonyl nickel | gms | 528 | in which formulation the ethyl cellulose has an ethoxyl content of between 47.5 and 49.0% by weight and a viscosity of approximately 200 centipoises in a 5% solution of 80:20 toluene to ethanol.

References Cited

UNITED STATES PATENTS

| | | | |
|---|---|---|---|
| 2,833,847 | 5/1958 | Salauze | 75—208 X |
| 3,197,847 | 8/1965 | Kerstetter | 75—208 X |
| 3,227,591 | 1/1966 | Lambert | 75—208 X |

BENJAMIN R. PADGETT, *Primary Examiner.*

CARL D. QUARFORTH, *Examiner.*

A. J. STEINER, *Assistant Examiner.*